United States Patent

[11] 3,555,947

[72] Inventor Morris Fram
 9765 Shadow Island Drive, Sunland, Calif. 91040
[21] Appl. No. 749,057
[22] Filed July 31, 1968
[45] Patented Jan. 19, 1971

[54] ROVING CUTTER WITH EJECTION BARS
 1 Claim, 3 Drawing Figs.
[52] U.S. Cl. .................................................. 83/116, 83/347, 83/913
[51] Int. Cl. .................................................. B26d 1/56, B26d 7/18
[50] Field of Search ........................................ 83/113, 114, 115, 116, 111, 119, 120, 346, 347, 913

[56] References Cited
 UNITED STATES PATENTS
 2,132,460 1938 Cumfer .................. 83/346X FOREIGN PATENTS
593,407 1934 Germany ...................... 83/114

Primary Examiner—Andrew R. Juhasz
Assistant Examiner—James F. Coan
Attorney—Johnston, Root, O'Keefe, Keil, Thompson & Shurtleff ABSTRACT: A glass roving cutter with a rotatable cutter wheel having a plurality of axial cutting blades spaced at close intervals about its periphery and projecting outwardly therefrom, an anvil roll defining therewith a roving cutting nip and an endless arrangement of axial ejection bars capable of movement within the spacings between the cutting blades but inwardly recessed from the cutting edges thereof at the nip and thereafter moving out of the spacings to eject the cuttings from the blades; said ejection bars preferably being eccentrically mounted on cutter wheel shaft.

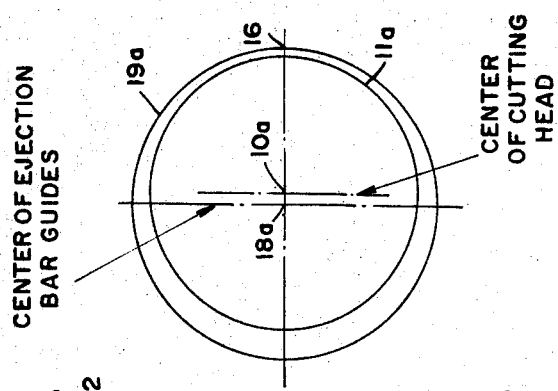
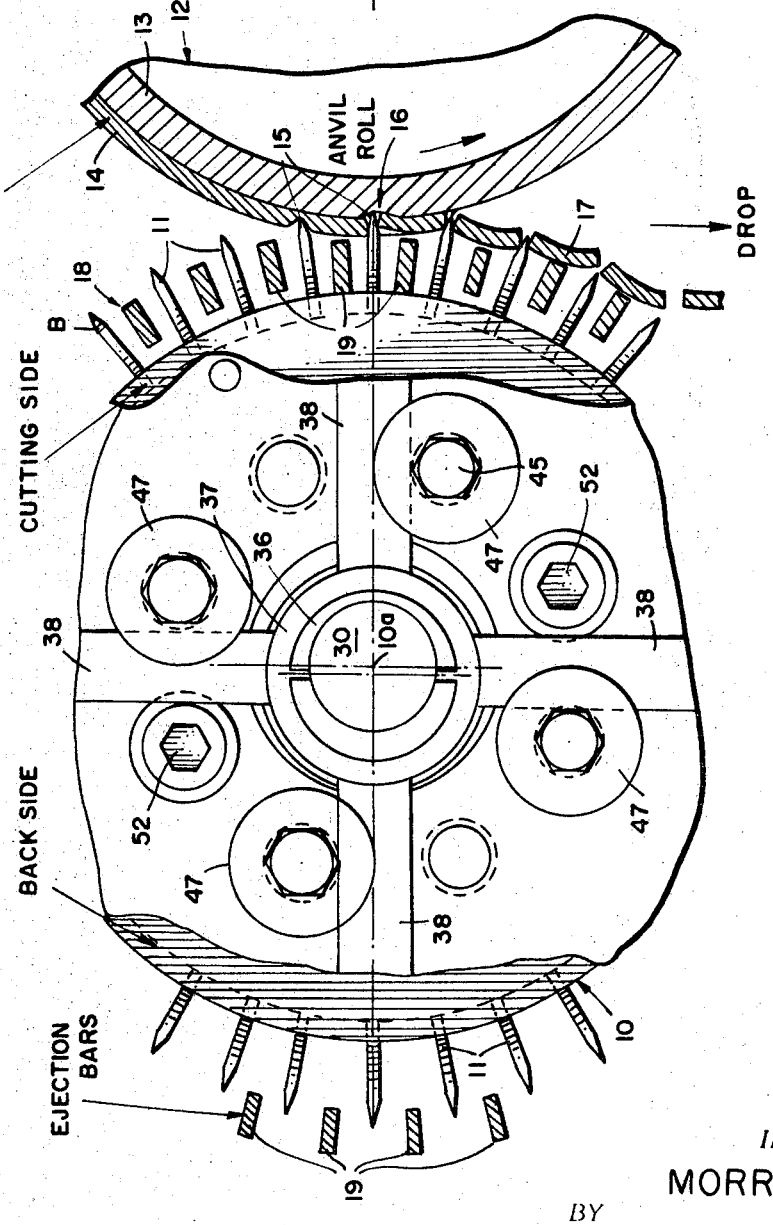

INVENTOR:
MORRIS FRAM

ROVING CUTTER WITH EJECTION BARS

BACKGROUND OF INVENTION

The present invention concerns improvements in roving cutters and is designed to prevent accumulation of cut roving in the spacings between axial cutting blades. There is a great need in this rapidly developing field for glass roving cutters which are capable of providing short, clean cuts, especially from heavy roving. These cuttings are added to thermoplastic polymers to form premixes that are used in injection molding. Relatively large diameter fibers, when cut into very short lengths act as rigid columns which become wedged between the cutter blades. After a few revolutions of the cutter, the space between the blades becomes filled and the roving cutting process is impaired.

One known technique for removing the wedged cuttings from between the cutter blades involves blowing compressed air into the space between the blades. While this technique has some success where the blade projections on the cutter are relatively large, the compressed air lowers the quality of the cut roving. The roving comprises a composite of very fine filaments. The ends of the cut roving are very easily blown into a fuzz, which materially reduces the quality of the cut material.

Another disadvantage of this known technique is that blades having a relatively large projection from the face of the cutting head require heavy type blades that are strong enough to withstand forces applied thereto during the cutting operation. Heavy and sharp blades are not generally available. Being less sharp than the usual thin roving cutter blades, they are more apt to tear the fibers by brute force. This also reduces the quality of the cut material.

BRIEF DESCRIPTION OF THE INVENTION

The present invention provides a roving cutter with a positive ejection means which pushes the fibers out of the spaces between the blades at every revolution of the cutting head. This obviates the need for heavy cutting blades and also the need for blowing of the cut fibers by compressed air. The quality of cuttings from heavy roving, especially relatively short lengths on the order of one-eighth inch, is vastly improved in comparison with prior art practices.

Briefly, the invention provides a roving cutter having a rotatable cutter wheel. The cutter wheel has a plurality of axial cutting blades, preferably of razorlike thickness, substantially equally spaced at close intervals about the periphery of the cutter wheel. These blades project radially outwardly from the cylindrical face of the cutter wheel.

An anvil member is provided contiguous to one side of the cutter wheel to define therewith a roving cutter nip. The anvil member preferably is a rotatable roll having a flexible, deformable cylindrical covering or sheath into which the cutting edges of the blades can bite or penetrate slightly to obtain a clean cutting of the filamentary material as it is conveyed through the nip. The positive roving ejector comprises a composite of ejection bars capable of movement within the spacings between cutter blades. These ejection bars are moved in an endless path and are guided into the spacings between said blades and at the nip are recessed from the outer cutting faces of the blades. The ejection bars thereby permit the outer cutting edges of the cutting blades to perform their cutting function at the nip. After the nip, the ejection bars move in their endless path out of the spacings between the cutting blades and thereby positively eject the cuttings from the spaces between the blades.

In a preferred form of the invention, the cutter bars are mounted in the form of a cylinder having an axis of rotation eccentrically offset in a direction away from the nip with respect to the axis of rotation of the cutter wheel. The diameter of the ejection bar cylinder is somewhat larger than the diameter of the base of the cutter wheel. The ejection bar cylinder may be rotatably mounted in this eccentric arrangement on the same shaft as the cutter wheel.

DESCRIPTION OF THE DRAWINGS

A preferred embodiment of the invention is illustrated in the drawings wherein:

FIG. 1 is a fragmentary side elevation, partly in section of the combination of a cutter wheel, an ejection bar cylinder and an anvil roller;

FIG. 3 is a diagrammatic view of the respective paths of rotation of the cutter wheel and ejection bar cylinder and the eccentric respective axes of rotation thereof.

DESCRIPTION OF PREFERRED EMBODIMENT

Figure 2:
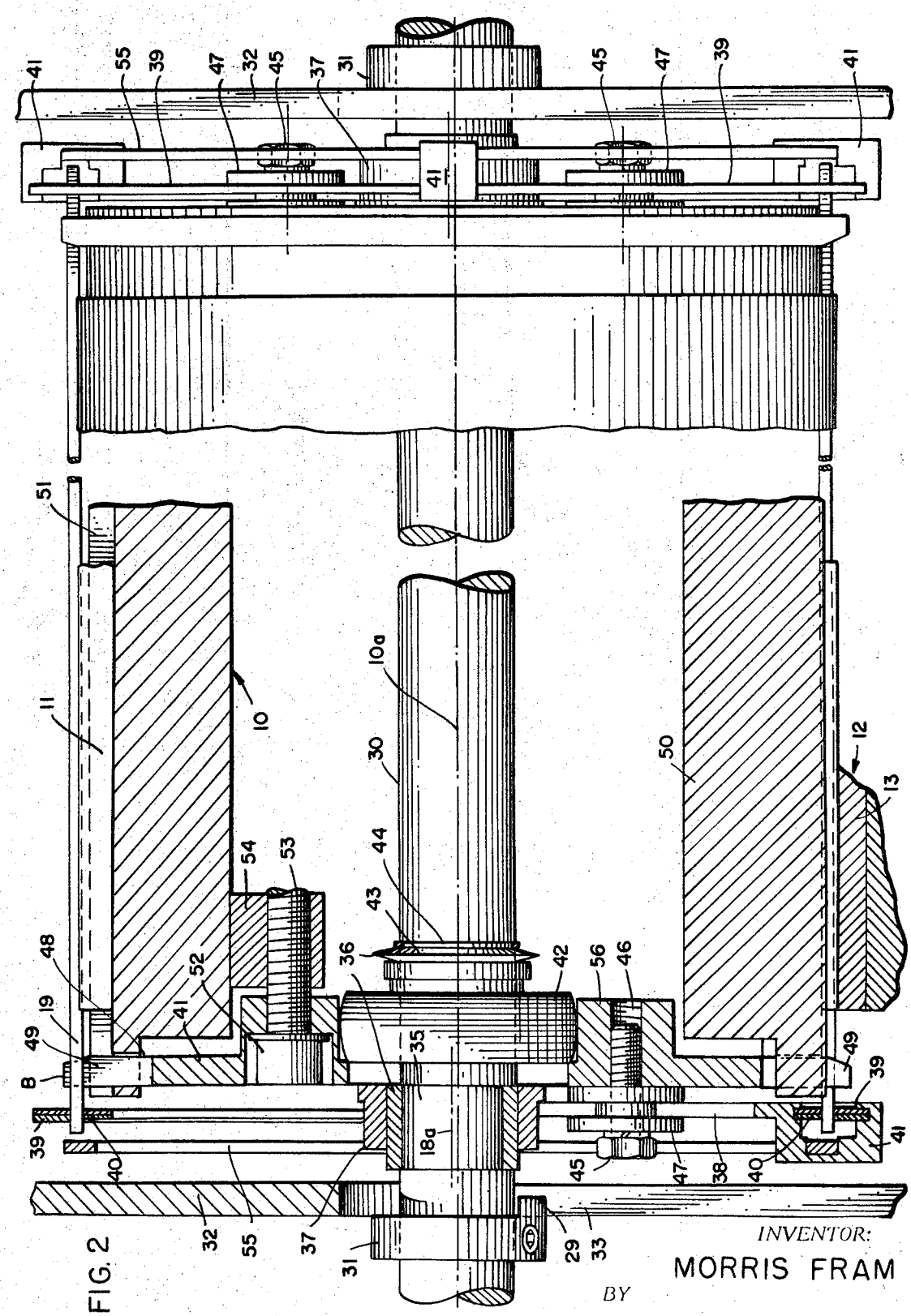
FIG. 2 is a top plan view in fragment and partly in diametric cross section of the combination of FIG. 1.

Referring to the drawings, FIG. 1 illustrates diagrammatically the roving cutting and roving ejection operation of the subject invention. A cylinder cutter head or cutter wheel 10 is rotatably journaled for rotation about the axis of rotation 10a. It has on its cylinder surface a plurality of radially projecting, axially extending cutter blades 11. An anvil roll 12 is rotatably mounted contiguous to one side of the cutter wheel 10. The anvil roll has a covering or sheath 13 of resiliently yieldable material whereby filamentary material, such as glass fibers 14, may be cut by the sharp edges 15 of the blades 11 at the nip 16 with a slight deformation of the outer face of the sheath or covering 13. The filamentary rovings 14 is cut into cut rovings 17 at the nip, the length of the cut rovings being substantially equal to the spacings between the cutting edges 15 of the blades 11.

To provide positive ejection of the cut rovings 17 and thereby prevent their tendency to accumulate or build up in the spaces between the blades 11, there is provided an endless composite 18 of ejection bars 19. The bars 19 have a width sufficient to eject the cut roving, while also permitting their ready entry into and out of the spaces between the blades. Relatively narrow but deep bars have been found to be highly satisfactory. In the nip 16 the bars are oriented with respect to the blades 11 so that their outer faces are recessed from the cutting edges 15 of blades 11 whereby the ejection bars do not interfere with the cutting action of the blades 11. After the ejection bars 19 have passed through the nip, they move in a direction out of the spaces between the blades 11 and in so moving positively eject the cut rovings 17 from the spaces between the blades 11.

For purposes of further illustrating the invention in greater detail, one preferred form of the invention is shown in FIG. 2. In this embodiment a nonrotatable shaft 30 is supported between end plates 32 of a roving cutting machine. The shaft and the members rotatably mounted thereon are urged by hydraulic or spring means (not shown) toward the anvil roll 12. The shaft 30 is slidably mounted between the plates 32 by means of the stops 31 having tongues 29 slidably received in slots 33 in the plates 32.

The shaft 30 has a pair of eccentrically ground segments 35 having an axis 18a offset from the axis 10a of shaft 30 in a direction away from the anvil roller 12. A bearing sleeve 36 rotatably journals the hub 37 on respective eccentric segments 35 to provide eccentric rotatable journaling for the ejector bar composite 19. The hubs 37 have a plurality of radial arms 38. The ejector bars 19 are supported at their respective ends by outer rings 39 and inner rings 40. These rings are mounted in and carried by the heads 41 on the outer ends of radial bars 38.

The shaft 30 has a pair of bearings 42 mounted thereon by a Belleville spring 43 and retaining ring 44. The bearings 42 rotatably journal ringlike end caps 56 of the cutter wheel on the shaft 30 for rotation about the axis of rotation 10a. The end caps 56 are tied to the radial arms 38 by bolts 45 threaded in tapped holes 46 and washer tie spacers 47 which overlie the arms 38 (FIG. 2). Thus the cutter wheel 10 and the ejector bar assembly are interjoined for rotation together.

The end caps 56 have a ring 48 secured about the outer edges thereof. The ring 48 carries a plurality of radially extending spacer bars 49 which project radially outwardly beyond the ejector bars 19 to keep the bars 19 in proper, spaced relationship.

The cutter wheel 10 comprises a hollow, cylindrical base 50 provided with a series of axially extending slits or grooves 51 in which the base portions of the cutter blades 11 are mounted. The base member 50 may be joined with the end caps 41 by any suitable means, e.g., by bolts 52 threadedly received in tapped holes 53 of radially inwardly directed ears 54 on the base 50. The heads 56 of the radial arms 38 may have a ring 55 mounted therein for the purpose of interconnecting and strengthening the outer ends of the radial arms 38.

As can be seen from FIG. 3, the cutting blades 11 orbit about a circular path 11a while the ejection bars 19 orbit about a slightly eccentric path 19a. The orbital paths 11a and 19a meet or may cross at the nip 16 so as to provide the ejection of the cut rovings as previously described after the cutter blades and the ejection bars have passed the nip 16. The invention thus provides apparatus for cutting roving into short stable lengths and is particularly suited for cutting relatively heavy rovings into short lengths.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

I claim:

1. A roving cutter comprising a shaft, a cutter wheel rotatably mounted on said shaft and having a plurality of axial cutting blades substantially equally spaced at close intervals about its periphery and projecting radially outwardly therefrom, an anvil member contiguous to one side of said cutter wheel defining therewith a roving cutting nip, an endless composite of ejection bars capable of movement in the spacings between said blades, a frame supporting said bars and mounted on said shaft for rotation about a pivot axis eccentric in a direction away from said anvil member to the axis of rotation of said cutter wheel, said frame including a hub rotatably journaled on said shaft, support means extending radially from said hub, and ring means on said support means for holding opposite ends of said bars.